United States Patent [19]

Ebert et al.

[11] Patent Number: 5,773,491
[45] Date of Patent: Jun. 30, 1998

[54] (CO)POLYCARBONATES STABILIZED AGAINST γ-RADIATION

[75] Inventors: Wolfgang Ebert, Krefeld; Ralf Hufen, Duisburg; Rüdiger Schubart, Bergisch Gladbach; Gerhard Fennhoff, Willich, all of Germany

[73] Assignee: Bayer AG, Leverkusen, Germany

[21] Appl. No.: 612,110

[22] Filed: Mar. 7, 1996

[30] Foreign Application Priority Data

Mar. 16, 1995 [DE] Germany .................. 195 09 511.1

[51] Int. Cl.⁶ .................. C08G 64/42; C08L 69/00; C08L 169/00; B29K 69/00
[52] U.S. Cl. .................. 523/136; 252/478; 252/600; 524/83; 524/84; 524/87; 524/107; 524/86; 548/146; 548/174; 548/188
[58] Field of Search .................. 252/600, 478; 523/136; 524/83, 84, 107, 86; 548/174, 146, 188

[56] References Cited

U.S. PATENT DOCUMENTS

| | | | |
|---|---|---|---|
| 4,148,800 | 4/1979 | Schubart et al. ............ | 260/306.7 |
| 4,873,271 | 10/1989 | Lundy et al. ............ | 523/136 |
| 4,996,245 | 2/1991 | Nelson et al. ............ | 523/136 |
| 5,055,505 | 10/1991 | Kao et al. ............ | 524/83 |
| 5,491,179 | 2/1996 | Mason ............ | 523/136 |

FOREIGN PATENT DOCUMENTS

| | | |
|---|---|---|
| 0 114 973 | 8/1984 | European Pat. Off. . |
| 0 152 012 | 8/1985 | European Pat. Off. . |
| 0 376 289 | 7/1990 | European Pat. Off. . |

*Primary Examiner*—Sharon Gibson
*Assistant Examiner*—Deanna Baxam
*Attorney, Agent, or Firm*—Connolly and Hutz

[57] ABSTRACT

The object of the present invention is polycarbonate molding compositions containing polycarbonates, stabilizers of the general formula (I)

$$R_1-X-CZ-Y-R_2$$

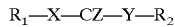

and optionally polypropylene glycols. The object of the present invention is also use of these molding compositions to produce items for medical applications.

4 Claims, No Drawings

(CO)POLYCARBONATES STABILIZED AGAINST γ-RADIATION

The invention relates to (co)polycarbonates, based on diphenols and one or more stabilizers, which are stabilized against the discolouring effects of γ-radiation.

The invention provides polycarbonate moulding compositions containing a) 97.5 wt. % to 99.9 wt. % of a polycarbonate or copolycarbonate and b) 0.1 wt. % to 2.5 wt. % of a γ-stabilizer of the general formula (I), with respect to 100 wt. % of a)+b) each time,

$$R_1\text{—}X\text{—}CZ\text{—}Y\text{—}R_2 \qquad (I)$$

in which $R_1$ and $R_2$ represent optionally branched $C_1$–$C_{36}$ alkyl groups, preferably optionally branched $C_1$–$C_{12}$ alkyl groups or optionally branched $C_{16}$–$C_{24}$ alkyl groups, optionally branched and/or substituted $C_7$–$C_{18}$ alkylaryl groups or aralkyl groups or optionally substituted $C_6$–$C_{18}$, preferably $C_6$, aryl groups, and in which X, Y and Z, independently of each other, are O or S, preferably S, particularly preferred groups $R_1$ and $R_2$ being those which are part of a 4 to 12-membered, preferably 5 or 6-membered heterocyclic ring system, due to the presence of groups X or Y, wherein Y then represents >$NR_3$, with $R_3$ representing the same groups as those mentioned for $R_1$ above, in particular methyl, benzyl or phenyl, and X and Z, independently of each other, representing oxygen or sulphur, preferably sulphur.

As a further stabilizer c) 0.1 wt. % to 3.5 wt. %, preferably 0.25 wt. % to 2.0 wt. %, of optionally terminally capped polypropylene glycol with an average molecular weight of 250 to 10,000, preferably 500 to 5,000, may be contained in the polycarbonate moulding compositions according to the invention, wherein the percentages by weight of c) are each with respect to 100 wt. % of a)+b).

The prior art relating to stabilization against γ-rays consists of providing the polycarbonate with oligomeric polypropylene glycols (EP 376 289), oligomeric brominated bis-phenol A polycarbonates (EP 114 973), blends of polycarbonate and polyesters based on terephthalic acid and cyclohexanedimethanol (EP 152 012) or organic disulphides, each being optionally combined with oligomeric polypropylene glycols.

The disadvantage of these stabilizers are, for instance, that polypropylene glycol on its own offers inadequate stabilization at high doses of radiation, that the use of brominated system is probably unacceptable due to the proportion of halogen present, that when using polyester blends steam sterilization cannot be used and that in the disulphide system there is a small processing window before decomposition sets in.

There is therefore the object of providing an additive system which is stable under the preparation and processing conditions, produces moulded articles which can be steam sterilized, in order to guarantee universal applicability, uses no halogen-containing stabilizers and guarantees adequate stabilization when irradiated with 5 Mrad.

The object is achieved according to the invention by addition of the stabilizer (I).

Suitable diphenols for production of the polycarbonates to be used according to the invention are those of the general formula (II)

$$HO\text{—}Z\text{—}OH \qquad (II)$$

with preferably 6 to 30 carbon atoms and are either mononuclear or else polynuclear diphenols which may contain hetero-atoms and may have substituents which are inert under the conditions of polycarbonate preparation and thermal irradiation thereof.

Examples which may be mentioned are hydroquinone, resorcinol, dihydroxy-diphenyl, bis-(hydroxyphenyl)-alkanes, bis-(hydroxyphenyl)-cycloalkanes, bis-(hydroxyphenyl)-sulphides, ethers, sulphoxides or sulphones and α,α-bis-(hydroxyphenyl)-diisopropylbenzenes and their ring-alkylated and ring-halogenated compounds.

Suitable diphenols are described, for example, in U.S. Pat. Nos. 3,028,365, 2,999,835, 3,062,781, 3,148,172 and 4,982,014, in German patents OS 1 570 703 and 2 063 050, and in the monograph "H. Schnell, Chemistry and Physics of Polycarbonates, Interscience Publishers, New York, 1964".

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, α,α-bis-(4-hydroxyphenyl)-m-dissopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl-butane, 1,1-bis-(3,5-dimethyl-4-hydroxyphenyl)-cyclohexane, α,α-bis-(3,5-dimethyl-4hydroxyphenyl)-p-diisopropylben 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methylcyclohexane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-1-phenylethane, 2,2-bis-(3,5-dimethyl-4-hydroxyphenyl)-2-phenylethane, 2,2-bis-(4-hydroxyphenyl)-2,2-diphenylethane, 9,9-bis-(4-hydroxyphenyl)-fluorene, 9,9-bis-(3,5-dimethyl-4-hydroxyphenyl)-flourene.

Particularly preferred diphenols are, e.g. 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(4-hydroxyphenyl)-1-phenylethane, 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-4-methylcyclohexane, 9,9-bis-(3,5-dimethyl-4-hydroxyphenyl)-flourene.

In particular, 2,2-bis-(4-hydroxyphenyl)-propane, 1,1-bis-(4-hydroxyphenyl)-3,3,5-trimethylcyclohexane and 1,1-bis-(4-hydroxyphenyl)-1-phenylethane, are preferred.

Any mixtures of the previously mentioned diphenols may also be used.

To improve the flow behaviour, small amounts, preferably amounts between 0.05 and 2.0 mol-% (with respect to moles of diphenols used), of tri or more than tri-functional compounds, in particular those with three or more than three phenolic hydroxyl groups are incorporated in a known way during synthesis. Some of the compounds which can be used are, for example, 1,3,5-tris-(4-hydroxyphenyl)-benzene, 1,3,5-tris-(4-(4-hydroxyphenylisopropyl)-phenyl)-benzene, 1,1,1 -tris-(4-hydroxyphenyl)-ethane, 2,6-bis-(2-hydroxy-5'-methylbenzyl)-4-methylbenzene, 2-(4-hydroxyphenyl)-2-(2,4-dihydroxyphenyl)-propane, hexakis-(4-(4-hydroxyphenyl-isopropyl)-phenyl) orthoterephthalate, tetrakis-(4-hydroxyphenyl)-methane, 1,1-bis-((4',4"-dihydroxytriphenyl)-methyl)-benzene, 3,3-bis-(4-hydroxyphenyl)-2-oxo-2,3-dihydr 3,3-bis-(4-hydroxy-3-methylphenyl)-2-oxo-2,3-dihydroindole, the chlorocarbonates corresponding to these compounds are also suitable, as well as the acids or preferably acid chlorides of more than dibasic aliphatic or aromatic carboxylic acids, such as for example 2,4-dihydroxybenzoic acid or 2,4-dihydroxybenzoic acid dichloride, trimesic acid or trimesic trichloride, trimellitic acid or trimellitic trichloride, cyanuric trichloride, wherein these branching agents may be initially introduced individually or as a mixture or added in portions during synthesis.

Chain terminators used in the synthesis may be phenols, optionally substituted phenols, their chlorocarbonates, monocarboxylates or their acid chlorides, preferably cumylphenol, phenol, tert.butylphenol and i-octylphenol, optionally as mixtures, with conventional impurities and isomers, wherein the chain terminators may be initially introduced individually or mixed with the diphenols or may be added in portions during synthesis.

The polycarbonates or polycarbonate mixtures to be used according to the invention can be prepared in essence by the following three known methods (see, H. Schnell, "Chemistry and Physics of Polycarbonates", *Polymer Review*, vol. IX, pages 27 et seq., Interscience Publishers, New York, 1964):

1. the solution process in dispersed phase, the so-called "two-phase boundary process"
2. the solution process in homogeneous phase, also called the "pyridine process"
3. the melt transesterification process.

Polycarbonates to be used according to the invention have average molecular weights $M_w$ (determined by measuring the relative viscosity in $CH_2Cl_2$ at 25° C. and a concentration of 0.5 g in 100 ml of $CH_2Cl_2$) of between 10,000 and 80,000, preferably between 15,000 and 40,000.

The following may be added to the polycarbonate moulding compositions according to the invention, before, during or after processing: conventional additives for thermoplastic polycarbonates such as stabilizers, thus, e.g. thermal stabilizers such as for example organic phosphites, optionally in combination with monomeric or oligomeric epoxides, UV stabilizers, in particular those based on nitrogen-containing heterocyclic compounds such as triazoles, optical brighteners, flame inhibitors, in particular fluorine-containing compounds such as perfluorinated salts of organic acids, polyperfluoroethylene, salts of organic sulphonic acids and combinations thereof, optionally other mould release agents, colorants, pigments, anti-static agents, fillers and reinforcing substances, in conventional amounts.

Stabilizers (I) are known from the literature relating to rubber chemistry (see, for example, Ullmann: "Encyclopedia of Industrial Chemistry" A 23, p. 370 et seq., 5th ed.) or are obtainable by processes known from the literature (see DOS 2 101 215, or U.S. Pat. No. 4,148,800).

Examples of these are:

a) esters of trithiocarbonic acid $R_1$—S—C(=S)—S—$R_2$, such as e.g.: the dimethyl, diethyl, di-i/n-propyl, di-i/n/tert.-butyl, di-i/n-pentyl, dicyclopentyl, dicyclohexyl, distearyl, dimyristyl, dipalmityl, dibenzyl or diphenyl esters.

b) esters of xanthogenic acid $R_1$—O—C(=S)—S—$R_2$ such as e.g: the dimethyl, diethyl, di-i/n-propyl, di-i/n/tert.-butyl, di-i/n-pentyl, dicyclopentyl, dicyclohexyl, distearyl, dimyristyl, dipaimityl, dibenzyl, diphenyl or dicresyl esters.

c) esters of dithiocarbamic acid $(R_3)_2$>N—C(=S)—S—$R_2$ such as e.g: those in which $R_2$ and $R_3$, independently of each other, may be methyl, ethyl, n/i-propyl, n/i/tert.-butyl, n/i-pentyl, cyclopentyl, cyclohexyl, palmityl, stearyl, myristyl, benzyl, phenyl or o/m/p-cresyl.

Preferred stabilizers (I), however, are cyclic compounds in which $R_3$ is defined in the same way as under c), but preferably represents methyl, phenyl or benzyl, such as:

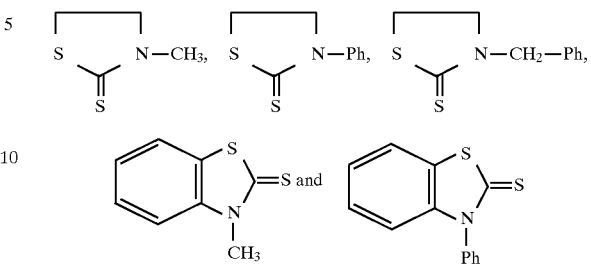

Quite particularly preferred stabilizers (I) are

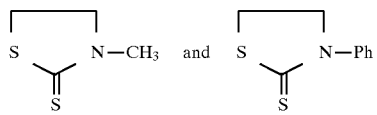

The stabilizers mentioned may be used individually or in any mixtures, in concentrations of 0.1 wt. % to 2.5 wt. %, wherein addition may take place in the form of the pure substance, as a powder or as a melt, but also as a solution, before or during processing of the polycarbonate resin, but may also take place in a final compounding stage. Dichloromethane and/or chlorobenzene may be use as a solvent for (I).

It may be an advantage if the moulding compositions also contain, in addition to the stabilizers mentioned, polypropylene glycols in amounts of 0.1 wt. % to 3.5 wt. %, preferably 0.25 wt. % to 2.0 wt. %, optionally terminally capped polypropylene glycols with an average molecular weight of 250 to 10,000, preferably 500 to 5,000. This type of polypropylene glycol is known from the literature. To eliminate the occasional occurrence of pale yellow discolourations it may be sensible also to provide the moulding compositions with conventional phosphorus-containing stabilizers for polycarbonates, depending on the circumstances.

Polycarbonates according to the invention may be processed to give moulded items by, for example, extruding the isolated polycarbonates to give granules in a known manner and processing these granules, optionally after addition of the abovementioned additives, by injection moulding to produce various articles in a known manner.

The polycarbonates according to the invention can be used in general wherever known polycarbonates have hitherto been used for this purpose, in particular, however, in medical fields of application, thus, for instance, for dialysis housings.

The object of the present invention is therefore use of the polycarbonite moulding compositions according to the invention for producing items for medical applications.

Polycarbonates according to the invention may, mostly for non-transparent applications, be admixed with other thermoplastic materials in conventional amounts, i.e. between 10 wt. % and 50 wt. %, with respect to the polycarbonate according to the invention.

Suitable other thermoplastic materials are, for example, aromatic polyester-carbonates, polycarbonates based on other bisphenols than those used in the polycarbonates according to the invention, polyalkylene terephthalates, EPDM polymers, polystyrene and copolymers and graft polymers based on styrene such as in particular ABS materials.

EXAMPLES

The specimens were prepared by compounding an additive-free, unstabilized polycarbonate with an average molecular weight of ca. 30,000 (Mw from GPC), solution viscosity η=1.293 at 300° C. on a twin screw extruder, with the stated amount of stabilizer, and then granulated. Colour sample sheets (thickness 4 mm) were then injection moulded from these granules. The yellowness index of these sheets is determined before irradiation (Hunter Lab instrument), then these test specimens are irradiated (dose: 5 Mrad; Co bomb), stored in the dark for 10 days and then the YI determined again. The quantity $Y_{diff}$ used for assessment is determined from the difference between the two measurements before and after irradation.

a) Comparison tests:

| Compound | Conc. (wt. %) | $YI_{initial}$ | $YI_{irrad}$ | $YI_{diff}$ |
|---|---|---|---|---|
| Polycarbonate$_{reextr.}$ | — | 6.31 | 48.88 | 42.57 |
|  | — | 6.27 | 48.07 | 41.80 |
| Polypropylene glycol | 0.75 | 4.58 | 29.24 | 24.66 |
|  | 0.75 | 4.70 | 30.07 | 25.37 |
| Distearyl disulphide | 0.50 | 10.47 | 25.93 | 15.46 |
|  | 0.50 | 10.16 | 25.70 | 15.54 | b) According to the invention:

| Compound | Conc. (wt. %) | $YI_{initial}$ | $YI_{irrad}$ | $YI_{diff}$ |
|---|---|---|---|---|
| Example 1: |  |  |  |  |
| Comp. A | 0.5 | 7.5 | 20.9 | 12.5 |
| Comp. A | 0.5 | 7.6 | 19.5 | 11.9 |
| Example 2: |  |  |  |  |
| Comp. A | 0.75 | 7.7 | 19.4 | 11.7 |
| Comp. A | 0.75 | 7.7 | 18.8 | 11.1 |
| Example 3: |  |  |  |  |
| Comp. A | 0.25 | 6.6 | 20.9 | 14.4 |
| Comp. A | 0.25 | 6.5 | 19.9 | 13.4 |
| Example 4: |  |  |  |  |
| Comp. B | 0.5 | 6.0 | 26.0 | 20.0 |
| Comp. B | 0.5 | 6.1 | 26.5 | 20.4 |
| Example 5: |  |  |  |  |
| Comp. B | 0.2 | 4.6 | 26.2 | 21.6 |
| Comp. B | 0.2 | 4.9 | 26.7 | 21.8 |

All the examples 1 to 5 contained an additional 0.75 wt. % of polypropylene glycol, mol. wt. ca. 2000. Two colour sheets were measured per test to be sure that the determinations were reliable.

Compound A: 3-methyl-thiazolidin-thione-2
Compound B: 3-methyl-5,6-benzo-thiazolidin-thione-2

We claim:

1. Polycarbonate moulding compositions comprising
   a) 97.5 wt. % to 99.9 wt. % of a polycarbonate or copolycarbonate and
   b) 0.1 wt. % to 2.5 wt. % of a γ-stabilizer represented by one of the formula

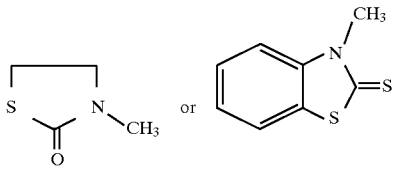

2. Moulding compositions according to claim 1, characterised in that they further contain c) 0.1 to 3.5 wt. % of optionally terminally capped polypropylene glycols with an average molecular weight of 250 to 10,000, wherein the percentage by weight of c) is with respect to 100 wt. % of a)+b).

3. Moulding compositions according to claim 1, characterised in that the stabilizer is 3-methyl-thiazolidin-thione-2.

4. Moulding composition according to claim 1, characterised in that the polycarbonates are synthesized from 2,2-bis-(4-hydroxyphenyl)-propane, 1,1-bis-(4-hydroxyphenyl)-3,3,5-trimethylcyclohexane and 1,1-bis-(4-hydroxyphenyl)-1-phenylethane or mixtures thereof.

* * * * *